United States Patent [19]

Peterson

[11] 4,377,359
[45] Mar. 22, 1983

[54] QUARTER-TURN NUT

[75] Inventor: Francis C. Peterson, St. Charles, Ill.

[73] Assignee: Illinois Tool Works Inc., Chicago, Ill.

[21] Appl. No.: 215,773

[22] Filed: Dec. 12, 1980

[51] Int. Cl.³ ............................................. F16B 39/28
[52] U.S. Cl. ................................. 411/112; 24/221 A; 411/103; 403/112
[58] Field of Search ............... 403/103, 107, 111, 112; 24/221 A, 221 R; 411/103, 107, 111, 112

[56] References Cited

U.S. PATENT DOCUMENTS

| | | | |
|---|---|---|---|
| 1,694,580 | 12/1928 | Carr | 85/32 |
| 2,233,242 | 2/1941 | Burke | 85/32 |
| 2,273,648 | 2/1942 | Kost | 85/32 |
| 2,283,122 | 5/1942 | Murphy | 85/32 |
| 2,448,213 | 8/1948 | Doonan | 85/1 X |
| 2,495,037 | 1/1950 | Tinnerman | 85/32 |
| 2,567,902 | 9/1951 | Bedford, Jr. | 85/32 |
| 2,572,588 | 10/1951 | Bedford, Jr. | 85/5 X |
| 2,748,825 | 6/1956 | Launay | 411/112 |
| 3,040,401 | 6/1962 | von Rath | 85/5 X |
| 3,080,633 | 3/1963 | Reddy | 24/221 R |
| 3,114,404 | 12/1963 | Fiddler | 151/41.75 |
| 3,121,273 | 2/1964 | Duffy et al. | 85/5 X |
| 3,208,122 | 9/1965 | Holton | 85/5 |
| 3,219,085 | 11/1965 | Zahodiakin | 411/112 |
| 3,605,846 | 9/1971 | Van Niel et al. | 411/112 |

FOREIGN PATENT DOCUMENTS 511488 8/1939 United Kingdom .............. 411/112

Primary Examiner—Wayne L. Shedd
Attorney, Agent, or Firm—Thomas W. Buckman

[57] ABSTRACT

A nut device permitting securement of and to thin panel members. An axially extending, internally threaded shank has two laterally extending flanges interconnected to one end, the flanges being bent downward. Two beam members extend laterally from the shank in a direction which is generally perpendicular to the flanges, the ends of the beam members being bent upwardly toward the flanges. The nut is inserted in a slot in the panel by positioning the beam members parallel to the slot, pushing downwardly on the beam members to flex the flanges so that the beam members may be rotated clockwise beneath the panel. The flanges and beam members cooperate to frictionally clamp the panel and resist lateral and rotational displacement relative to the panel. A specially configured tool is also disclosed.

8 Claims, 8 Drawing Figures

QUARTER-TURN NUT

BACKGROUND AND SUMMARY OF THE INVENTION

This invention relates to a quarter-turn nut to enable secure attachment to thin panels and a tool for inserting same.

As material costs and weight considerations in conjunction with new stronger materials lead manufacturers of automobiles and applicances, for example, to reduce material thickness, it becomes increasingly difficult to fasten together and fasten to these panels. The thinness of these materials makes normal thread engagement impossible. Further, many prior art nut and cage nut devices require access to the backside of the panel, which is not always available.

The present invention provides a simple but effective solution to this fastening problem. An internally threaded nut has a pair of outwardly extending, downwardly bent flanges and a pair of perpendicularly positioned upwardly bent beam members. The beam members are inserted through a rectangular aperture in the panel, pushed downward against the spring force created by the flanges, and the nut rotated ninety degrees. The panel cams the beams downwardly during rotation. The interaction of the downwardly bent flanges and upwardly bent beams serve to clamp the panel creating a frictional resistance to lateral and rotational displacement of the nut, once it is assembled to the panel. If desired, this frictional resistance can be overcome to adjust the lateral position of the nut within the slot, for example. A convenient insertion tool is also disclosed.

The features, objects and advantages of the present invention will be better understood after a reading of the following specification taken in conjunction with the accompanying drawings.

DETAILED DESCRIPTION OF THE PREFERRED EMBODIMENTS

Figure 1:
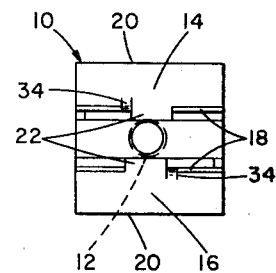
FIG. 1 is a top view of one embodiment of the nut of the present invention.
Figure 2:
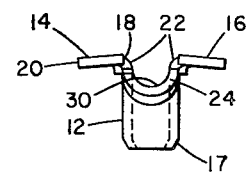
FIG. 2 is an end view of the nut shown in FIG. 1.

The quarter-turn nut of the present invention is shown generally at 10. A central, internally threaded shank 12 which is depicted as a cylindrical stem, extends axially with flanges 14 and 16 extending laterally outwardly from one end thereof in first and second generally opposite directions. The second end 17 of the shank is a free or unconnected end. This end 17 may be pinched inwardly to provide a locking feature for the fastener to be associated therewith. Each flange has an inner edge 18 and an outer edge 20. Shoulder means 22 which form extensions of shank 12, interconnect the shank to the inner edge 18 of each flange 14 and 16. Preferably, shoulders 22 have partial threads thereon along their vertical surfaces (as seen in FIG. 2). Outer edge 20 is in an axial plane which is different from that occupied by the inner edge 18 to enable it to engage the panel first and provide a spring load.

Figure 3:
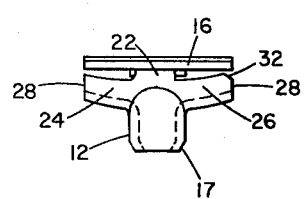
FIG. 3 is a side view of the nut depicted in the first two figures.

As best seen in FIG. 3, beam members 24 and 26 extend laterally outwardly from the shank 12 in third and fourth generally opposite directions which are generally perpendicular to the first and second extension directions of the flanges. The outer end 28 of each beam is bent upwardly (as seen in FIG. 3) lying nearer to the flanges 14 and 16 than the inner end of the beam. Each beam 24, 26 generally comprises a semi-cylindrical segment with the diametral plane forming upwardly directed, panel-engaging edges. These segments are hollows having a first arcuate configuration formed along the inner surface 30 of each beam. The leading edges, as determined for a clockwise rotational direction, have chamfered or beveled corners 32 to enable the upturned beams to be cammed downwardly by the panel.

Figure 6:
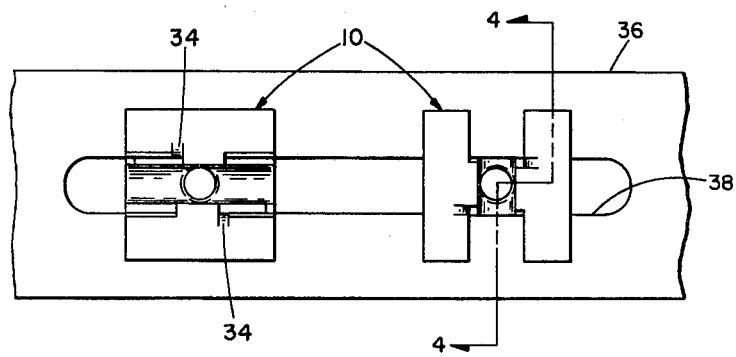
FIG. 6 is a top view of two nuts and a panel, the nuts being shown in the inserted and assembled positions.

The nut is preferably provided with a pair of axially extending projections 34 diametrally positioned adjacent the trailing portion of the inner edge 18 of each flange 14, 16. As shown in FIG. 6, the slots dividing the beam members from the shank are longer on the leading edge side of each beam. This reduces this diametral dimension to less than the slot width enabling rotation. The opposite slot diametral dimension exceeds the slot width and prevents counterclockwise rotation into the slot and limits the clockwise rotation to ninety degrees.

As seen in FIG. 6 on the left side, quarter-turn nut 10 has been inserted in elongated aperture or slot 38 of panel 36. As depicted, the length of the slot may exceed the length of the nut in order to provide lateral adjustment of the quarter-turn nut or to provide multiple nut installation in a single slot 38. With the nut in this position, a downward force is exerted on beam members 24 and 26 to overcome the spring bias of flanges 14 and 16 and position the chamfered edges 32 of the beam members below the under side of panel 36. The nut 10, is then rotated ninety degrees clockwise to the position shown on the right side of FIG. 6, the shorter beam slots stopping further rotation.

In this position, the downwardly bent flanges 14, 16 and upwardly bent beam members 24, 26 cooperate to clamp the panel 36 providing frictional resistance to lateral and rotational motion. This frictional resistance can be overcome to vary the lateral-position of the nut, but the clamping of the flanges and beam members insures the nut will remain in the position that is desired. Further, axial projections 34 engage the edges of slot 38 and resist counter rotation. The nut is inserted in the clockwise direction with the projections resisting counterclockwise rotation. Further, the shorter slots prevent additional clockwise rotation induced by the fastener being inserted into the nut attempting to disengage it.

Figure 4:
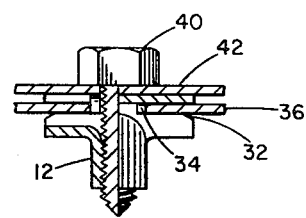
FIG. 4 is a cross-sectional view as seen along line 4—4 in FIG. 6 showing the nut and its fastener in the assembled position.

Two additional forces resist removal. The downwardly directed flanges 14 and 16 engaging the surface of panel 36 causes shoulder 22 to be pushed toward one another. As the fastener 40 is initially inserted, it engages the partial threads on the shoulders and forces the shoulders apart. This increases the diagonal dimension from shoulder to shoulder of the flanges to a dimension greater than the slot width. Once the fastener is inserted, rotation in either direction is effectively resisted. The second resisting force is administered by the member 42 which is being clamped to panel 36. As the fastener approaches its fully seated position (shown in FIG. 4), the forces tending to rotate the nut will increase. However, the frictional clamp load being administered by member 42 from above and panel 36 from below will increase at a faster rate preventing undesired removal.

Figure 5:
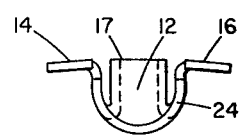
FIG. 5 is an end view of a second embodiment of the nut of the present invention.

FIG. 5 depicts a second embodiment of quarter-turn nut 10. In this embodiment, the free end 17 projects upwardly to a position between the inner edges 18 of flanges 14 and 16. This configuration provides a lower profile nut while requiring a slightly larger slot in the panel since the flanges must come outside the shank 12. The size of the nut, material from which it is made and length of the shank can all be varied to suit the particular needs of the application.

Figure 7:
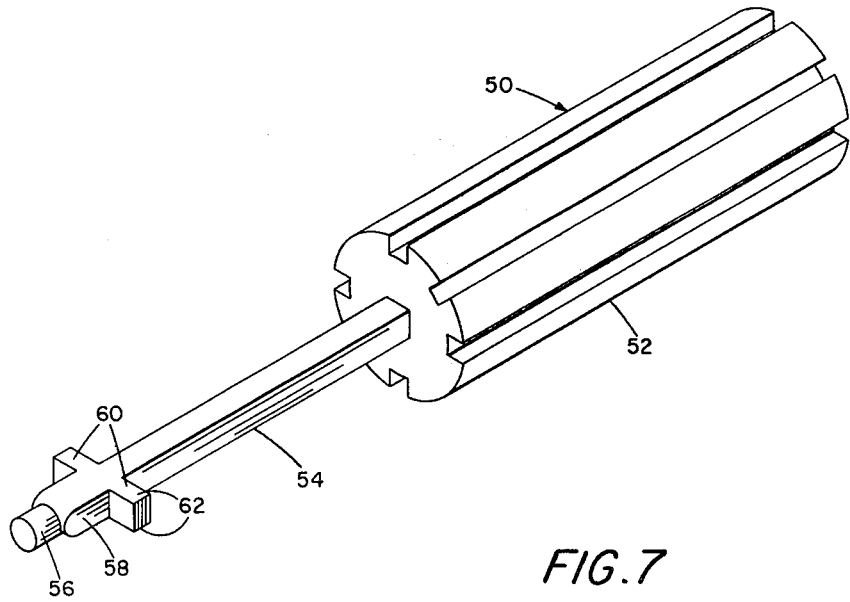
FIG. 7 is a perspective view of an insertion tool which forms a part of the present invention.

FIG. 7 depicts a tool for installing this quarter-turn nut, the tool being shown generally at 50. The tool includes a handle 52 from which shaft 54 extends. Shaft 54 has a pilot portion 56 which can be received within shank 12 of the nut. Body portion 58 has a second configuration on its outer surface which is complementary to the configuration on the inner surface on the hollow beam members. A pair of rods 60 project outwardly from shaft 54 in generally opposite directions, these rods having planar lateral sides 62 which are spaced by a distance which is substantially equal to the distance between the shoulders 22 of nut 10.

Figure 8:
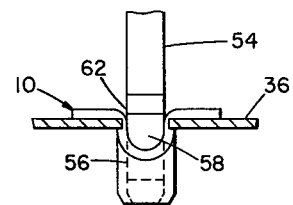
FIG. 8 is a cross-sectional side view showing the tool engaged with the nut, the nut being in the inserted position.

As depicted schematically in FIG. 8, with the nut in the inserted position, the pilot portion 56 is placed within shank 12. Body portion 58 is brought into mating engagement with the complementary surface of beams 24 and 26. A downward force is exerted on the beam members by this body portion to flatten flanges 14 and 16 and bring the beam members beneath panel 36. The tool and nut are then rotated in a clockwise direction through ninety degrees, the force being transmitted from the tool 50 to nut 10 by the engagement between rods 60 and portions of inner edges 18 on flanges 14 and 16. The nut 10 is then in the installed position shown on the right side of FIG. 6.

Various changes, modifications and alterations will become apparent to a person of ordinary skill in the art following a reading of the foregoing specification. Accordingly, it is intended that all such changes, modifications and alterations as come within the scope of the appended claims be considered as being a part of the present invention.

I claim:

1. A quarter-turn nut for blind-bore insertion into an elongated, generally rectangular aperture in a thin panel, said nut comprising a central, axially extending, internally threaded shank; a pair of flanges each having an inner edge and an outer edge and being interconnected to a first end of the shank by means connected to the inner edge of the flange, the second shank end constituting a free end, said flanges extending laterally outwardly from said shank in first and second generally opposite directions, the outer edge of each flange being in a different axial plane from the inner edge, such that the outer edge will engage the panel first during insertion to create a spring load when assembled to the panel; a pair of beam members extending outwardly from said shank in third and fourth generally opposite directions, said third and fourth directions being generally perpendicular to said first and second directions, the outer end of each beam member being axially nearer the flanges than the inner end, such that when the beam members are inserted through the aperture in the panel and forced downwardly against the spring load of the flanges and the nut rotated ninety degrees thereby deflecting the beam members to positions underlying the panel, the spring-loaded flanges engaging the upper surface of the panel and the deflected beam members engaging the lower surface of the panel cooperate to frictionally resist axial and rotational displacement of the nut.

2. The quarter-turn nut of claim 1 wherein the rotationally leading edge of each beam member has a chamfered corner to assist the panel in deflecting the beam member.

3. The quarter-turn nut of claim 1 wherein each beam member generally comprises a semi-cylindrical segment with the diametral plane of the segment forming panel-engaging edges.

4. The quarter-turn nut of claim 1 wherein the free end of the shank lies generally between the inner edges of said two flanges.

5. The quarter-turn nut of claim 1 wherein the shank comprises a cylindrical stem portion extending axially from said beam members.

6. The quarter-turn nut of claim 5 wherein the periphery of the free end of the shank is pinched radially inwardly to provide a locking feature for a screw associated therewith.

7. The quarter-turn nut of claim 1 wherein the nut further comprises a pair of axially extending projections positioned generally diametrally along the panel engaging side of the flanges such that as the nut is rotated clockwise into the rectangular aperture, the axially extending projections will extend into the aperture and engage the edges thereof to resist counter clockwise rotation of the nut with respect to the aperture.

8. The quarter-turn nut of claim 1 wherein two pairs of slots separate the beam members from the shank, the slots on the leading rotational direction being deeper than the trailing slots, the diametral dimension between the shorter slots exceeding the aperture width in the panel such that rotation of the nut beyond ninety degrees is effectively prevented.

* * * * *